June 7, 1949.  O. B. ACKERLY, JR  2,472,558
ROTARY DRUM FILTER

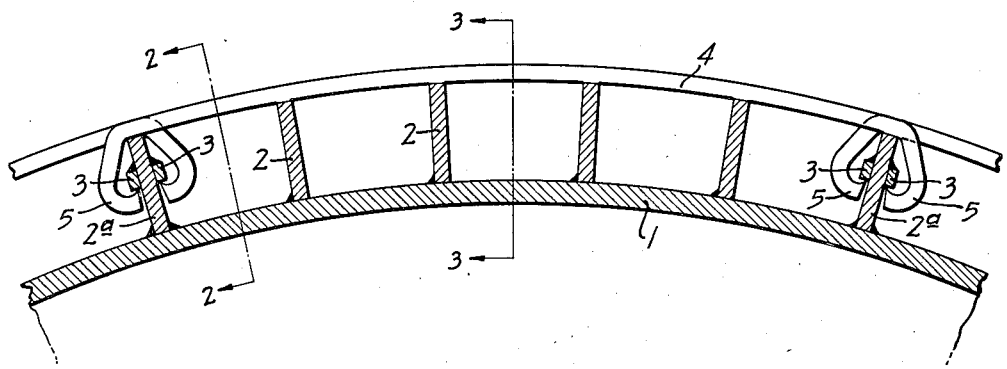
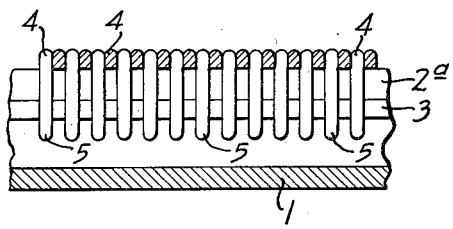
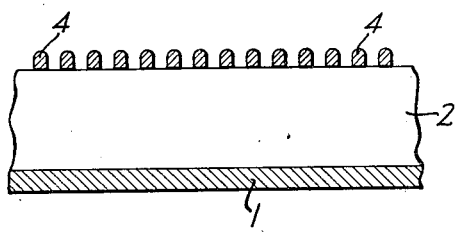

Filed Dec. 27, 1945  2 Sheets-Sheet 2

INVENTOR.
ORVILLE B. ACKERLY, JR.
BY

Patented June 7, 1949

2,472,558

UNITED STATES PATENT OFFICE 2,472,558

ROTARY DRUM FILTER

Orville B. Ackerly, Jr., Piedmont, Calif., assignor to Oliver United Filters Incorporated, Oakland, Calif., a corporation of Nevada Application December 27, 1945, Serial No. 637,345

6 Claims. (Cl. 210—202)

This invention relates in general to rotary drum filters and more particularly to the deck of the drum of such a filter.

As is well known in the art, rotary drum filters include a rotary filter drum provided at either end with trunnions journaled in bearings mounted on a filter tank. The surface of the drum is divided into a plurality of independent and longitudinally extending filtrate compartments by longitudinally extending, peripherally spaced division strips, each communicating through internal conduits with an automatic valve associated with one of the drum trunnions and by means of which each compartment is successively subjected to a differential filtering pressure and to a blowback pressure.

Disposed within each of the filtrate compartments is a drainage screen, and surrounding the structure so formed is a grid or screen for supporting a fabricated filter medium. This supporting screen or grid sometimes takes the form of a continuous wire winding surrounding the drum. Ordinarily the wire is wound on ¼ inch centers, and consequently it will be seen that about 2⅓ miles of wire is required in winding an eight foot diameter, ten-foot face drum. Although a wire wound deck serves as an excellent support for the filter medium, it has several disadvantages. In the first place, since the wire expands and contracts with variations in temperature, the winding becomes loose upon an increase in temperature. Upon a decrease in temperature the wire becomes taut and on occasions will break. When a break occurs the wire drum has to be completely rewound, and this of course means that the filter is shut down for a considerable length of time.

In general the object of this invention is the provision of a deck for a rotary drum filter including a plurality of peripherally spaced, longitudinally extending rigid bars secured to the outer face of the drum and a plurality of separate, parallel and interdigitated grid bars individually and detachably secured to the rigid bars to form a continuous parallel grid structure surrounding the drum.

The invention possesses other advantageous features, some of which with the foregoing will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Fig. 1 is a fragmentary vertical section taken through a filter drum provided with a deck embodying the objects of my invention.

Fig. 2 is a section taken on the section line 2—2 of Fig. 1.

Fig. 3 is a section taken on the section line 3—3 of Fig. 1.

Figure 4:
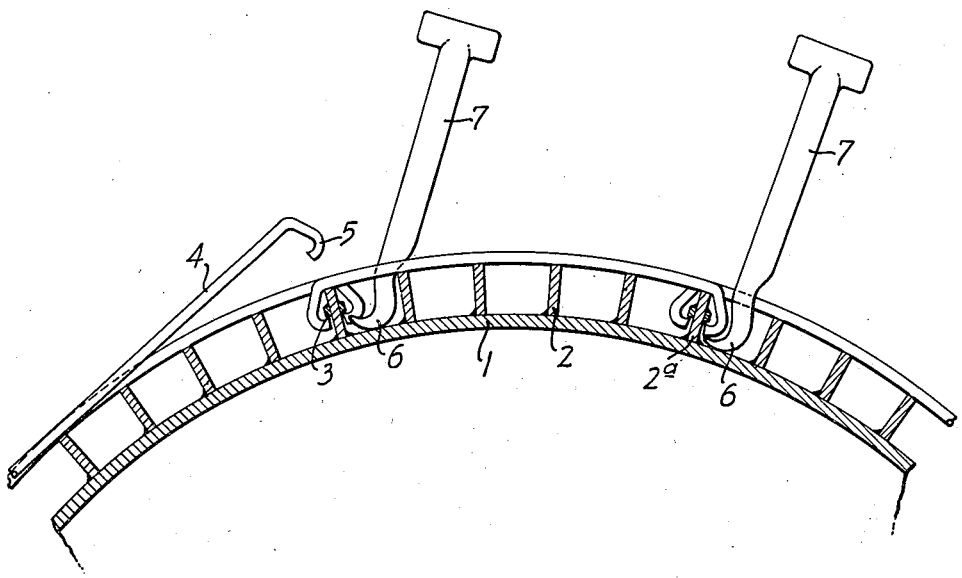
Fig. 4 is a fragmentary vertical section taken through a drum provided with a deck such as is shown in Figs. 1, 2 and 3 and illustrating the manner in which the sections are removed.
Figure 5:
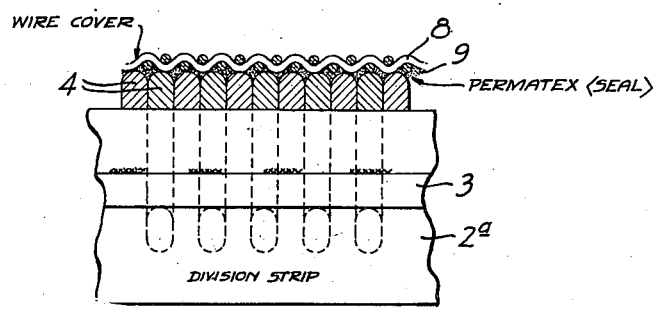
Fig. 5 is a fragmentary longitudinal section taken through a deck embodying the objects of my invention and showing the method by which the woven wire filter cover is sealed over and to the wire sections immediately above the division strips of the drum so as to form independent filtrate compartments.

As shown in these various figures, the objects of my invention have been embodied in a rotary drum filter including a steel drum 1 on which are welded a plurality of peripherally spaced longitudinally extending rigid ribs on bars 2. Welded to either side of certain of these ribs 2a, which may hereafter be designated as division strip bars, are longitudinally extending shoulder bars 3; these bars being located substantially midway the top and bottom of the division strips.

Supported on the division strip bars 2a and on the rigid bars 2 are flexible wire sections or grid bars 4, each provided on both of its ends with an underturned or underlying hook 5 arranged to engage the lower edge of the shoulder bars 3. All of the grid bars 4 subtending any two contiguous division strip bars 2a are spaced laterally a distance equal to the diameter of the wires or bars by the hook 5 of another similar parallel set of grid bars 4 engaging each of the two contiguous division strip bars 2a at one end and secured at their opposite ends to the next succeeding division strip bars 2a. In this manner each of the filtrate compartments extending between any two contiguous division strip bars 2a is covered by a set of longitudinally spaced parallel grid bars, the adjacent filtrate compartment defined by one of these division strip bars and the next succeeding division strip bar being covered with an intervening set of longitudinally spaced grid bars 4.

Each of the resilient and normally straight grid bars 4 is readily installed by securing the hook 5 at one of its ends beneath the shoulder bar 3 of one of the division strips and then bending the section 4 downwardly so as to spring the hook 5 at its opposite end over the shoulder bar 3 of the next succeeding division strip bar. This having been done, other grid bars 4 are similarly secured in place over each compartment until the entire drum has been covered.

To remove any one of the grid bars 4, the hooked end 6 of a tool 7 is placed beneath one of the hooks of the grid bars and then the tool 7 is fulcrumed about the adjacent rib 2 as shown on the right side of Figure 4 so as to pull the hook 5 of the grid bar 4 away from the shoulder bar 3. In the left side of Figure 4, the tool 7 has completed the removal of the hook 5, the grid bar 4 being shown in its normally straight condition.

After the entire surface of the filter drum has been built up with the wire grid bars 4 as above described, so as to form a continuous parallel grid structure over the drum, a filter medium in the form of a woven wire screen or cover 8 is placed around the deck grid so formed and is sealed to the overlapping hooked ends of the grid bars 4 immediately above and along the division strip bars 2a by any suitable sealing compound 9 such as "Permatex."

The cross-sectional form of the grid bars is immaterial although conveniently they can be made from heavy resilient wire.

From the above description it will be noted that I have provided a sectionalized grid decking which can be readily made to form a true cylindrical surface and which can be easily repaired at any desired point by simply removing one or more of the damaged grid bar sections in the manner above described. Obviously a grid decking of this kind obviates the necessity of completely unwinding and winding the continuous spiral wire decking previously used on filters of this type.

I claim:

1. A drum of a rotary drum filter comprising: a plurality of peripherally spaced, longitudinally extending division strip bars secured and sealed to said drum and each provided on each of its sides with a longitudinally extending shoulder; and a plurality of rods overlying each successive pair of division strip bars transversely thereof, each end of each of said rods terminating in a downwardly and inwardly extending hook and each of said hooks being detachably secured under one of said shoulders.

2. A drum of a rotary drum filter comprising: a plurality of peripherally spaced, longitudinally extending division strip bars secured and sealed to said drum; independent grid bars overlying each successive pair of division strip bars transversely thereof; and means for detachably securing each end of each of said grid bars to one of said division strip bars, the grid bars overlying one pair of division strip bars being laterally offset with respect to the grid bars overlying the next succeeding pair of division strip bars in interdigitating relation thereto.

3. A drum of a rotary drum filter comprising: a plurality of peripherally spaced, longitudinally extending rigid bars secured and sealed to the outer face of said drum; a first set of independent and parallel grid bars overlying and detachably secured to a first selected pair of said rigid bars transversely thereof; and a second set of independent and parallel grid bars overlying and detachably secured to a second selected pair of said rigid bars transversely thereof, the ends of the first set of grid bars being disposed between the ends of said second set of grid bars.

4. A drum of a rotary drum filter comprising: a plurality of longitudinally extending peripherally spaced rigid bars secured and sealed to the outer surface of said drum; and a plurality of parallel, separate and interdigitated grid bars overlying said rigid bars transversely thereof and individually and detachably secured there to form a parallel grid structure surrounding said drum.

5. A drum of a rotary drum filter comprising: a plurality of peripherally spaced, longitudinally extending rigid bars secured and sealed to the outer surface of said drum, each of said bars being provided with lateral shoulders; a plurality of resilient parallel, separate and interdigitated grid bars overlying said rigid bars transversely thereof to form a continuous parallel grid structure overlying said drum; and underlying hooks formed on the ends of said grid bars, said hooks being detachably secured to said shoulders.

6. A drum of a rotary drum filter comprising: a plurality of longitudinally extending and peripherally spaced division strip bars secured to and dividing said drum into a plurality of separate filtrate compartments; a plurality of separate and parallel grid bars overlying certain selected pairs of division strip bars transversely thereof; and a plurality of separate and parallel grid bars overlying other selected pairs of division strip bars transversely thereof, said grid bars being individually and detachably secured to said division strip bars and forming a parallel grid structure surrounding and bounding said filtrate compartments.

ORVILLE B. ACKERLY, Jr.

REFERENCES CITED

The following references are of record in the file of this patent:

UNITED STATES PATENTS

| Number | Name | Date |
| --- | --- | --- |
| 748,756 | Kuchenmeister | Jan. 5, 1904 |
| 2,289,411 | Denhard et al. | July 14, 1942 |